United States Patent
Sharp et al.

(10) Patent No.: US 12,088,539 B2
(45) Date of Patent: *Sep. 10, 2024

(54) DETERMINING REPLY CONTENT FOR A REPLY TO AN ELECTRONIC COMMUNICATION

(71) Applicant: GOOGLE LLC, Mountain View, CA (US)

(72) Inventors: Phillip Neal Sharp, Sunnyvale, CA (US); Prabhakar Raghavan, Saratoga, CA (US); Thompson Alexander Ivor Gawley, Palo Alto, CA (US); Balint Miklos, Zurich (CH); Karol Kurach, Zurich (CH); Tobias Kaufmann, Zurich (CH); Gregory Sean Corrado, San Francisco, CA (US); László Lukács, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,231

(22) Filed: Nov. 28, 2022

(65) Prior Publication Data

US 2023/0353513 A1    Nov. 2, 2023

Related U.S. Application Data

(63) Continuation of application No. 16/938,366, filed on Jul. 24, 2020, now Pat. No. 11,516,156, which is a (Continued)

(51) Int. Cl.
*H04L 51/02* (2022.01)
*G06F 16/35* (2019.01)
(Continued)

(52) U.S. Cl.
CPC ............ *H04L 51/02* (2013.01); *G06F 16/355* (2019.01); *G06F 40/186* (2020.01); *G06F 40/56* (2020.01);
(Continued)

(58) Field of Classification Search
CPC ....... H04L 51/02; H04L 67/535; G06N 20/00; G06F 16/355; G06F 40/56; G06F 40/186; G06Q 10/107
See application file for complete search history.

(56) References Cited

U.S. PATENT DOCUMENTS

| | | |
|---|---|---|
| 6,278,996 B1 | 8/2001 | Richardson et al. |
| 6,718,367 B1 | 4/2004 | Ayyadurai |

(Continued)

FOREIGN PATENT DOCUMENTS

| | | |
|---|---|---|
| CN | 1628298 | 6/2005 |
| CN | 102184225 | 9/2011 |

(Continued)

OTHER PUBLICATIONS

China National Intellectual Property Administration; Notification of Third Office Action issue in Application No. 202011416819.8; 7 pages; dated Mar. 29, 2023.

(Continued)

*Primary Examiner* — Suraj M Joshi
(74) *Attorney, Agent, or Firm* — Gray Ice Higdon

(57) ABSTRACT

Methods and apparatus related to determining reply content for a reply to an electronic communication. Some implementations are directed generally toward analyzing a corpus of electronic communications to determine relationships between one or more original message features of "original" messages of electronic communications and reply content that is included in "reply" messages of those electronic communications. Some implementations are directed gen- (Continued)

erally toward providing reply text to include in a reply to a communication based on determined relationships between one or more message features of the communication and the reply text.

18 Claims, 8 Drawing Sheets

Related U.S. Application Data continuation of application No. 16/115,162, filed on Aug. 28, 2018, now Pat. No. 10,728,184, which is a continuation of application No. 14/620,630, filed on Feb. 12, 2015, now Pat. No. 10,079,785.

(51) Int. Cl.
*G06F 40/186* (2020.01)
*G06F 40/56* (2020.01)
*G06N 20/00* (2019.01)
*G06Q 10/107* (2023.01)
*H04L 67/50* (2022.01)
*G06Q 50/00* (2012.01)

(52) U.S. Cl.
CPC ........... *G06N 20/00* (2019.01); *G06Q 10/107* (2013.01); *H04L 67/535* (2022.05); *G06Q 50/01* (2013.01)

(56) References Cited

U.S. PATENT DOCUMENTS

| | | | |
|---|---|---|---|
| 6,718,368 B1* | 4/2004 | Ayyadurai | H04L 51/212 709/204 |
| 7,469,280 B2 | 12/2008 | Simpson | |
| 8,078,978 B2 | 12/2011 | Perry et al. | |
| 8,296,140 B2 | 10/2012 | Bangalore et al. | |
| 8,862,519 B2 | 10/2014 | O'Sullivan et al. | |
| 9,807,037 B1* | 10/2017 | Sapoznik | G06F 40/35 |
| 2008/0109735 A1 | 5/2008 | Vuong | |
| 2010/0169441 A1 | 7/2010 | Lafleur et al. | |
| 2010/0317420 A1 | 12/2010 | Hoffberg | |
| 2012/0150859 A1 | 6/2012 | Hu | |
| 2012/0253801 A1 | 10/2012 | Santos-Lang et al. | |
| 2012/0323928 A1* | 12/2012 | Bhatia | H04L 51/02 707/E17.058 |
| 2013/0144890 A1* | 6/2013 | Liu | G06Q 10/10 707/E17.069 |
| 2013/0159432 A1 | 6/2013 | Deering et al. | |
| 2014/0019117 A1* | 1/2014 | Ravi | H04L 51/04 704/9 |
| 2014/0280623 A1 | 9/2014 | Duan | |

FOREIGN PATENT DOCUMENTS

| | | |
|---|---|---|
| CN | 102262634 | 11/2011 |
| CN | 103608837 | 2/2014 |
| CN | 103826004 | 5/2014 |
| CN | 103902630 | 7/2014 |
| CN | 104050256 | 9/2014 |
| CN | 104182607 | 12/2014 |
| EP | 1571578 | 9/2005 |
| EP | 2602751 | 6/2013 |

OTHER PUBLICATIONS

China National Intellectual Property Administration; Second Office Action issued for Application No. 202011416819.8, 9 pages, dated Aug. 10, 2022.
Ntellectual Property Office of Great Britain; Hearing Decision issued in Application No. 2116574, 12 pages, dated Sep. 26, 2022.
Intellectual Property Office of Great Britain; Request for a Decision by Hearing Officer issued in Application No. GB2116574.1, 7 pages, dated May 16, 2022.
Intellectual Property Office of Great Britain; Examination Report under Section 18(3) issued in Application No. GB2116574.1; 7 pages; dated Feb. 4, 2022.
China National Intellectual Property Administration: Office Action issued for Application No. 202011416819.8 dated Jan. 6, 2022.
Great Britain Patent Office; Combined Search Report and Examination Report issued in Application No. GB2116574.1; 9 pages; dated Nov. 29, 2021.
Intellectual Property Office of Great Britain; Examination Report under Section 18(3) issued in Application No. 1714398.3; 7 pages; dated Jul. 12, 2021.
Intellectual Property Office of Great Britain; Examination Report issued in Application No. 1714398.3; 9 pages; dated Mar. 25, 2021.
China National Intellectual Property Administration; Notification of Notice of Allowance issue in Application No. 201680010190.2; 4 pages; dated Sep. 22, 2020.
China National Intellectual Property Administration; Notification of First Office Action issue in Application No. 201680010190.2; dated Mar. 9, 2020.
Bevand, Marc; Zorinaq, mrb's blog, "A Decentralized API to Personal Information," http://blog.zorinaq.com/?e=76; Jul. 13, 2014, 8 pages.
Yousefi, et al. "Using Semantic Constraints to Improve Question Answering." In Natural Language Processing and Information Systems, pp. 118-128. Springer Berlin Heidelberg, 2006.
International Search Report and Written Opinion of PCT Serial No. PCT/US16/017524 dated May 19, 2016.
International Searching Authority; Copy of International Preliminary Report and Written Opinion of PCT Serial No. PCT/US16/017524; 8 Pages; dated Aug. 24, 2017.
China National Intellectual Property Administration; Notice of Grant issued for Application No. 202011416819.8, 7 pages, dated Jun. 28, 2023.

* cited by examiner

DETERMINING REPLY CONTENT FOR A REPLY TO AN ELECTRONIC COMMUNICATION

BACKGROUND

Users are often inundated with electronic communications such as emails, SMS communications, and social networking communications. Many electronic communications that are sent to a user explicitly solicit a reply or otherwise contain information to which the user may wish to reply. For example, an email that contains "Are you interested in grabbing lunch?" may explicitly solicit a reply. An email that contains "I just got engaged!" may not explicitly solicit a reply, but a user that receives the email may still wish to send a congratulatory reply to the email. Users formulate replies to the electronic communications and input the formulated replies at computing devices utilizing a keyboard (e.g., a virtual keyboard of a smartphone or tablet), a microphone, and/or other user interface input device(s) of the computing device.

SUMMARY

This specification is directed generally to methods and apparatus related to determining reply content for a reply to an electronic communication. Some implementations are directed generally toward analyzing a corpus of electronic communications (e.g., emails, SMS communications, and/or social networking communications) to determine relationships between one or more original message features of "original" messages of electronic communications and reply content that is included in "reply" messages of those electronic communications. For example, the corpus may be analyzed to determine a relationship between the original message n-grams "attached" and "draft document(s) for your review" and the reply n-gram "I'll take a look and will provide feedback" based on the original message n-grams occurring frequently in original messages that were replied to with the reply n-gram (and optionally other content). In some implementations, the relationships between the original message feature(s) and the reply content may be determined without allowing direct human access to one or more (e.g., any) of the electronic communications of the corpus. In some implementations, the relationships between the original message feature(s) and the reply content may be determined based on training a machine learning system with training examples each having one or more output parameters indicative of reply content of a reply message of a respective electronic communication and one or more input parameters indicative of original content of the original message of the respective electronic communication.

Some implementations are directed generally toward providing reply text to include in a reply to a communication based on determined relationships between one or more message features of the communication and the reply text. For example, an email may be sent to the user and include "Our team just won the Awesomeness Award!" and the reply text "Good job!" may be provided as a candidate reply to the email based on a mapping (data defining a relationship) between one or more features of the email and "Good job!". For instance, the reply text may be provided for auto-population in a reply to the email, provided for presentation (visually or audibly) as a suggestion for selection by the user, etc. As another example, an email may be sent to the user and include "Our team just won the Awesomeness Award!" and the reply text "Good job!" may be provided to the user as a reply to the email based on a mapping between one or more features of the email and reply content that is indicative of a congratulatory n-gram in general—and a mapping that defines "Good job!" as a highly ranked congratulatory n-gram. For instance, "Good job!" may be defined as a highly ranked congratulatory n-gram based on it being a popular congratulatory n-gram for the user, for a group of users similar to the user, or for all users. In some implementations, the reply text may be provided for inclusion in a reply to a communication independent of any textual input provided by the user in generating the reply to the communication. In other words, in some implementations the reply text may be presented to the user before the user has even started typing the reply. In some implementations, the reply text to include in a reply to a communication may be determined based on output provided by a trained machine learning system in response to providing the trained machine learning system with one or more message features of the communication.

In some implementations, a computer implemented method may be provided that is performed by at least one computer system and includes the steps of: identifying a corpus of electronic communications of a plurality of users, the electronic communications of the corpus each including a reply message and an original message to which the reply message is responsive; determining reply content that occurs in the reply message of a plurality of the electronic communications of the corpus; determining at least one message feature based on the original message of a plurality of the electronic communications that include the reply content in the reply message; calculating, based at least in part on a quantity of the electronic communications that include both the reply content and the at least one message feature, a strength of relationship value between the reply content and the at least one message feature; and defining a relationship between the at least one message feature and the reply content based on the strength of relationship value, the relationship defined for use in electronically providing the reply content for presentation to recipients of additional electronic communications that include the at least one message feature.

This method and other implementations of technology disclosed herein may each optionally include one or more of the following features.

In some implementations, defining the relationship between the at least one message feature and the reply content based on the strength of relationship value comprises: defining the relationship; and assigning the strength of relationship value to the relationship.

In some implementations, defining the relationship between the at least one message feature and the reply content based on the strength of relationship value comprises: determining the strength of relationship value satisfies a threshold; and defining the relationship based on determining the strength of relationship value satisfies the threshold.

In some implementations, the method further comprises: identifying an electronic communication sent to a user; determining the electronic communication includes the at least one message feature; identifying the reply content based on the relationship between the at least one message feature and the reply content; and providing electronically the reply content for potential inclusion in a reply to the electronic communication. In some of those implementations, identifying and providing the reply content for potential inclusion in the reply to the electronic communication occurs independent of any textual input provided via a computing device of the user in generating the reply to the message. In some of those implementations, the strength of relationship value is assigned to the relationship between the at least one message feature and the reply content, and the method further comprises: identifying additional reply content based on an additional relationship between the at least one message feature and the additional reply content; and identifying an additional strength of relationship value for the additional relationship; wherein providing the reply content for potential inclusion in the reply to the electronic communication is based on comparison of the strength of relationship value and the additional strength of relationship value. Providing the reply content for potential inclusion in the reply to the electronic communication based on comparison of the strength of relationship value and the additional strength of relationship value may comprise: providing the reply content for potential inclusion in the reply to the electronic communication without providing the additional reply content for potential inclusion in the reply to the electronic communication; or determining a display prominence for each of the reply content and the additional reply content based on the strength of relationship value and the additional strength of relationship value, and providing both the reply content and the additional reply content (with an indication of the display prominences) for potential inclusion in the reply to the electronic communication.

In some implementations, the at least one message feature includes an n-gram in text of the original message of the electronic communications. In some of those implementations, determining the at least one message feature comprises determining the n-gram based on at least one of: a count of occurrences of the n-gram in the electronic communications that include the reply content in the reply message; and an overall popularity measure associated with the n-gram.

In some implementations, determining the reply content that occurs in the reply message of the plurality of the electronic communications of the corpus comprises: grouping the electronic communications of the corpus into a plurality of clusters based on similarities between text in the reply messages of the electronic communications of the corpus; and determining the reply content based on the text of the reply messages of one cluster of the clusters. In some of those implementations, the reply content is an indicator of a plurality of unique n-grams that have similar semantic meanings. In some of those implementations, the method further comprises assigning a plurality of n-grams to the reply content, the n-grams being determined based on a quantity of the reply messages of the one cluster that include the n-grams. In some of those implementations, determining the at least one message feature based on the original message of the plurality of the electronic communications that include the reply content comprises determining the at least one message feature based on text of the original messages of the one cluster; and calculating the strength of relationship value between the reply content and the at least one message feature is based at least in part on a quantity of the electronic communications of the one cluster that include both the reply content and the at least one message feature.

In some implementations, the method further comprises: annotating text of the original message of one or more of the electronic communications with one or more annotations; wherein the at least one message feature includes an n-gram that includes one or more terms from the text of the one or more electronic communications and includes one or more of the annotations. In some of those implementations, the at least one message feature includes the one or more terms from the text of the one or more electronic communications and the one or more of the annotations includes an entity category that replaces one or more other terms of the original message of the one or more electronic communications.

In some implementations, identifying the corpus of communications comprises: selecting the electronic communications for inclusion in the corpus based on the reply text of each electronic communications being less than a reply text threshold length.

In some implementations, the method further comprises: generating training examples each having an output parameter indicative of the reply content and one or more input parameters indicative of the at least one message feature of a respective of the electronic communications that include the reply content; and training a machine learning system based on the training examples, the training the machine learning system including calculating the strength of relationship value and defining the relationship. In some of those implementations, determining the reply content that occurs in the reply message of the plurality of the electronic communications of the corpus comprises: grouping the electronic communications of the corpus into a plurality of clusters based on similarities between text in reply messages of the electronic communications of the corpus; and determining the reply content based on the text of the reply message of electronic communications of one cluster of the clusters.

In some implementations, a computer implemented method may be provided that is performed by at least one computer system and includes the steps of: identifying an electronic communication sent to a user; determining at least one message feature based on the electronic communication; determining, independent of any textual input provided via a computing device of the user in generating a reply to the electronic communication, candidate reply text for inclusion in the reply to the message, the determining based on at least one defined relationship between the at least one message feature and the candidate reply text; and providing the candidate reply text for inclusion in the reply to the electronic communication.

This method and other implementations of technology disclosed herein may each optionally include one or more of the following features.

In some implementations, determining the candidate reply text comprises determining a strength of relationship value between the at least one message feature and the candidate reply text; and providing the candidate reply text for inclusion in the reply to the message is based on the strength of relationship value.

In some implementations, determining the candidate reply text comprises: identifying a first relationship of the at least one defined relationship, the first relationship being between a first message feature, of the at least one message feature, and the candidate reply text; identifying a second relationship of the at least one defined relationship, the second relationship being between a second message feature, of the at least one message feature, and the candidate reply text; and identifying a first strength of relationship value for the first relationship and a second strength of relationship value for the second relationship; and providing the candidate reply text for inclusion in the reply to the message is based on the first strength of relationship value and the second strength of relationship value.

In some implementations, a strength of relationship value is assigned to the relationship between the at least one message feature and the candidate reply text, and the method further comprises: identifying an additional candidate reply text based on an additional relationship between the at least one message feature and the additional reply content; identifying an additional strength of relationship value for the additional relationship; and providing the reply content for potential inclusion in the reply to the message is based on comparison of the strength of relationship value and the additional strength of relationship value. In some of those implementations, providing the candidate reply text for potential inclusion in the reply to the message based on comparison of the strength of relationship value and the additional strength of relationship value comprises: providing the candidate reply text for potential inclusion in the reply to the message without providing the additional candidate reply text for potential inclusion in the reply to the message. In some of those implementations, providing the candidate reply text for potential inclusion in the reply to the message based on comparison of the strength of relationship value and the additional strength of relationship value comprises: determining a display prominence for each of the candidate reply text and the additional reply content based on the strength of relationship value and the additional strength of relationship value; and providing both the candidate reply text and the additional candidate reply text for potential inclusion in the reply to the message, wherein the candidate reply text and the additional candidate reply text are provided with an indication of the display prominences.

In some implementations, the at least one message feature includes an n-gram in the original text of the one or more electronic communications.

In some implementations, determining the candidate reply text comprises: identifying a first relationship of the at least one defined relationship, the first relationship being between the at least one message feature and a category of reply; identifying a second relationship of the at least one defined relationship, the second relationship being between the category of reply and the reply text. In some of those implementations, the method further comprises: determining a second strength of relationship value for the second relationship based at least in part on content of the electronic communication and/or a quantity of past replies of the user that include the reply text; and providing the candidate reply text for inclusion in the reply to the message is based on the second strength of relationship value.

In some implementations, determining the candidate reply text comprises: providing the at least one message feature as input to a trained machine learning system and receiving an indication of the candidate reply text as output from the trained machine learning system. In some of those implementations, the indication of the candidate reply text is a category of reply and the reply text is determined based on a defined relationship between the reply text and the category of reply.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
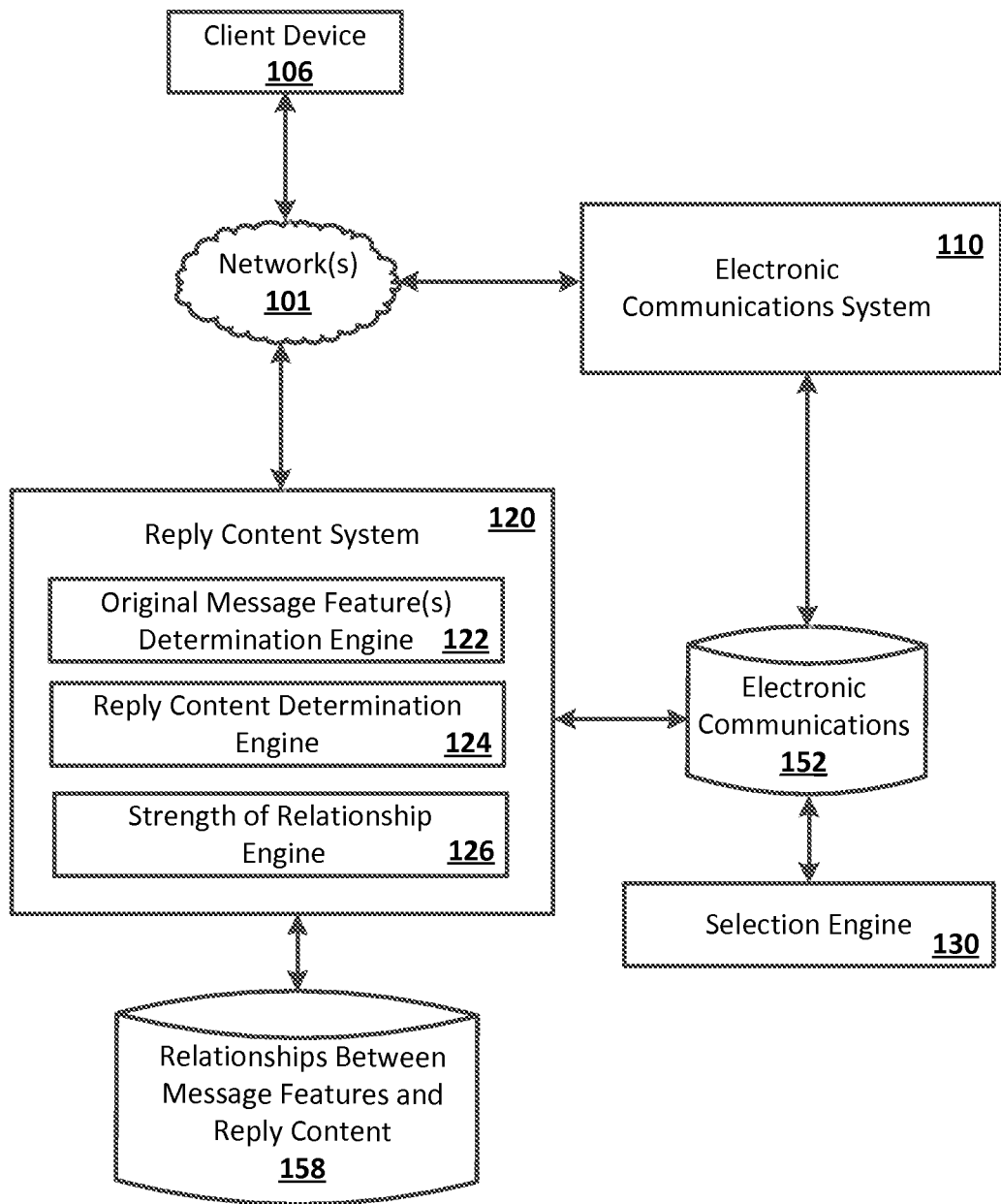
FIG. 1 illustrates an example environment in which a corpus of electronic communications may be analyzed to determine relationships between one or more original message features and reply content and/or in which reply text to include in a reply to a communication may be determined based on at least one defined relationship between one or more message features of the communications and the reply text.

FIG. 1 illustrates an example environment in which a corpus of electronic communications may be analyzed to determine relationships between one or more original message features and reply content and/or in which reply text to include in a reply to a communication may be determined based on at least one defined relationship between one or more message features of the communications and the reply text. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment includes a client device 106, an electronic communications system 110, a reply content system 120, a selection engine 130, an electronic communications database 152, and a relationships between message features and reply content database 158.

Electronic communications system 110 and reply content system 120 may each be implemented in one or more computers that communicate, for example, through a network (not depicted). Electronic communications system 110 and reply content system 120 are example systems in which the systems, components, and techniques described herein may be implemented and/or with which systems, components, and techniques described herein may interface. Electronic communications system 110 and reply content system 120 each include one or more memories for storage of data and software applications, one or more processors for accessing data and executing applications, and other components that facilitate communication over a network. In some implementations, electronic communications system 110 and/or reply content system 120 may include one or more components of the example computer system of FIG. 9. The operations performed by electronic communications system 110 and reply content system 120 may be distributed across multiple computer systems. In some implementations, one or more aspects of reply content system 120 may be combined with electronic communications system 110 and/or one or more aspects of electronic communications system 110 and/or reply content system 120 may be implemented on the client device 106.

Generally, in some implementations reply content system 120 analyzes a corpus of electronic communications, such as a corpus of electronic communications of electronic communications database 152, to determine relationships between one or more original message features of "original" messages of communications and reply content that is included in "reply" messages of those communications. In some of those implementations, the relationships between the original message feature(s) and the reply content may be determined without allowing direct human access to one or more (e.g., any) of the electronic communications of the corpus.

Generally, in some implementations, reply content system 120 additionally and/or alternatively determines and provides reply text to include in a reply to a communication, such as a communication provided by client device 106 and/or a communication of electronic communications database 152 to which a user has yet to reply. The reply content system 120 may determine the reply text based on one or more determined relationships between one or more message features of the communication and the reply text. In some implementations, the reply content system 120 may provide the reply text for inclusion in a reply to a communication independent of any textual input provided by the user in generating the reply to the communication.

The electronic communications database 152 includes one or more storage mediums that include all, or portions of, electronic communications of a plurality of users. In some implementations, the electronic communications database 152 is maintained by the electronic communications system 110. For example, the electronic communications system 110 may include one or more email systems and the electronic communications database 152 may include a plurality of emails that are sent and/or received via the email systems. As another example, the electronic communications system 110 may include one or more social networking systems and the electronic communications database 152 may include a plurality of messages, posts, or other communications that are sent and/or received via the social networking systems.

As used herein, an "electronic communication" or "communication" may refer to an email, a text message (e.g., SMS, MMS), an instant message, a transcribed voicemail, or any other electronic communication that includes at least some textual content. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth.

As used herein, "electronic communication" and "communication" will be utilized, depending on the context, to refer to both an electronic communication that includes only an original message and an electronic communication that includes one or more original messages and includes one or more reply messages. An electronic communication may be a single document such as an email that includes both an original message and a reply message and that can be processed to distinguish the original message and the reply message. Processing an electronic communication to distinguish an original message and a reply message may include "splitting" the message based on presence of metadata, message breaks, header information included in the message, quotes provided around the original message, etc. An electronic communication may also be multiple documents that are mapped to one another based on at least one of the multiple documents being responsive to other of the multiple documents. For example, an electronic communication may include a first email that is an original message received by a user and a second email sent by the user as a reply to that original message, or original and reply SMS messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

As used herein, an original message is earlier in time to a responsive reply message, but is not necessarily the first message in an electronic communication. For example, an original message may be the first in time message in an electronic communication and a reply message that is responsive to that original message may be a later in time (e.g., the next in time) message. Also, for example, an original message may additionally and/or alternatively be the second, third, or fourth in time message in an electronic communication and a reply message that is responsive to that original message may be a later in time message in the electronic communication. Each of an original message and a reply message may include one or more of associated text, metadata, and/or other content (e.g., attachments, embedded images).

In various implementations, reply content system 120 may include an original message feature(s) determination engine 122, a reply content determination engine 124, and/or a strength of relationship engine 126. In some implementations, all or aspects of engines 122, 124, and/or 126 may be omitted. In some implementations, all or aspects of engines 122, 124, and/or 126 may be combined. In some implementations, all or aspects of engines 122, 124, and/or 126 may be implemented in a component that is separate from reply content system 120. Reply content system 120 is described herein as a single system that determines relationships between one or more original message features of "original" messages of communications and reply content that is included in "reply" messages of those communications; and that determines and provides reply text to include in a reply to a communication, such as a communication provided by client. However, in some implementations, a first system may determine the relationships and a separate second system may determine and provide reply text based on the determined relationships.

Generally, in determining relationships between one or more original message features and reply content, reply content determination engine 124 identifies a corpus of electronic communications that include a reply message and an original message to which the reply message is responsive, and determines reply content that occurs in the reply message of a plurality of the electronic communications of the corpus.

In some implementations, the selection engine 130 may select, based on one or more criteria, communications to include in the corpus that is identified and analyzed by the reply content determination engine 124. For example, the selection engine 130 may restrict which electronic communications are included in the electronic communications database 152 based on the criteria and the electronic communications database 152 may be utilized as the corpus. Also, for example, the selection engine 130 may flag or otherwise annotate certain communications of the electronic communications database 152 as those that are appropriate for inclusion in the corpus and those annotated communications may be utilized as the corpus.

In some implementations, the selection engine 130 may select electronic communications for inclusion in the corpus of electronic communications based on the electronic communications including an "original" message and a "reply" message that is responsive to the original message. As described herein, an electronic communication that includes an original message and a reply message may be a single document and/or multiple documents that are mapped to one another. In some implementations, the selection engine 130 selects electronic communications for inclusion in the corpus based on the reply text of the reply message of each of the electronic communications being less than a reply text threshold length and/or based on the original text of the original message of each of the electronic communications being less than an original text threshold length. For example, only communications that include reply text that is less than 20 words and/or less than 100 characters may be selected.

In some implementations, the selection engine 130 may employ one or more techniques to reduce the occurrence of certain types of communications in the corpus. For example, where the corpus includes emails, the reply content determination engine 124 may employ techniques to filter out emails that are likely from businesses. For instance, emails from certain e-mail addresses, emails from email addresses with certain domain names, emails from email addresses with certain prefixes, emails with certain n-grams in a subject line, etc. may be filtered out of the corpus. Also, for instance, emails that conform to certain business templates may be filtered out. Also, for instance, emails that are likely spam may be filtered out.

In some implementations, the selection engine 130 selects electronic communications for inclusion in the corpus based on other attribute(s) associated with the communications and/or the sender(s) and/or recipient(s) of the communications. For example, if it is desirable to determine relationships between original message features and reply n-grams for a particular geographic region, communications associated with that geographic region may be selected for inclusion in the corpus.

In some implementations, the reply content determination engine 124 determines a reply n-gram that occurs in the reply text of reply messages of at least a threshold number of the electronic communications of the corpus and utilizes the reply n-gram as reply content. The threshold number may be set, for example, based on privacy considerations and/or efficiency considerations. In some of those implementations, the reply n-gram may be an n-gram that consists of the entirety of the reply text of one or more reply messages of the electronic communications of the corpus. In some implementations, the reply n-gram may be an n-gram that occurs in one or more particular segments of the reply text (e.g., the first sentence, or the first phrase) of one or more reply messages of the electronic communications of the corpus. In some implementations, the reply n-gram may include portions of the reply text of multiple reply messages of the electronic communications of the corpus and include an identifier of a category of other portions of the reply text of the multiple reply messages. For example, an n-gram of "see you there [sender's first name]" may be determined based on occurrences of "see you there Bob" in an email sent from Bob, "see you there Jane" in an email sent from Jane, etc.

In some implementations, the reply content determination engine 124 groups the corpus of electronic communications into a plurality of clusters and determines reply content based on the reply messages of one or more of the electronic communications of one of the clusters. In those implementations, the reply content determination engine 124 groups the corpus of electronic communications into a plurality of clusters based on one or more attributes shared among one or more electronic communications within the corpus. For example, the reply content determination engine 124 may group to the corpus of electronic communications into clusters based on similarities between the reply text of reply messages of the electronic communications of the corpus, such as semantic, syntactic, and/or textual similarities. Generally, the reply messages of electronic communications that are grouped in a given cluster will be more similar to one another (based on the similarities utilized in the grouping) than to the reply messages grouped in other clusters.

Generally, each of the determined clusters corresponds to a different category of reply content. For example, one cluster may contain electronic communications with "congratulatory" reply content such as the n-grams "Congrats!", "That's awesome", and "Way to go"; and another cluster may contain electronic communications with "thank you" reply content such as the n-grams "Thanks", "I appreciate it", and "Many thanks." In some implementations, the reply content for a given cluster may include, for example, an identifier of a category (e.g., "congratulatory" reply content), an identifier of the n-grams that occur in reply content most frequently in the electronic communications of the cluster (e.g., the 50 most frequent n-grams), and/or other identifier of the content.

In some implementations, the reply content determination engine 124 may utilize one or more clustering algorithms in grouping the corpus of electronic communications into a plurality of clusters based on similarity measures between the reply content. For example, in some implementations x-means clustering may be utilized, with the distance between reply content being based on the similarity measures between the reply content. Generally, x-means clustering is an unsupervised method of finding the ideal k to use for k-means clustering. Generally, k-means clustering aims to partition observations into a plurality of groups, with each observation being included in a group with which it is most related. Additional and/or alternative clustering techniques may optionally be used.

Generally, in determining relationships between one or more original message features and reply content, the original message features determination engine 122 determines one or more original message features based on the original message of one or more of the electronic communications that include the reply content. For example, where the reply content is an n-gram, the original message features determination engine 122 may determine the original message features based on analyzing the original message of one or more of the electronic communications that include the n-gram in a reply message. Also, for example, where the reply content indicates reply content of a cluster of electronic communications determined by reply content determination engine 124, the original message features determination engine 122 may determine the original message features based on analyzing the original message of one or more of the electronic communications of the cluster of electronic communications.

In some implementations, a frequently occurring n-gram in the original text of the original message of one or more of the electronic communications that include the reply content may be determined as a message feature. Additional and/or alternative message feature(s) may be determined such as co-occurrence of two or more n-grams in the text of the original message of one or more of the electronic communications that include the reply content. The co-occurrence of the two or more n-grams may optionally be co-occurrence in a particular order (e.g., a first n-gram before a second n-gram), in a certain positional relationship (e.g., within n terms or characters of one another), etc. Additional and/or alternative original message features may include, for example, features based on one or more natural language processing tags applied to text of the original message (e.g., parts of speech, named entities, tone); features based on text that occurs specifically in the subjects, the first sentences, the last sentences, or other portion of the original messages; features based on metadata of the original messages such as times the original messages were sent, days of the week the emails were sent, a number of recipients, a type of device that sent the original message, etc. As one example, an original message feature determined by original message features determination engine 122 may be: co-occurrence of a particular n-gram in the subject of a plurality of the original with another particular n-gram in the body of those original messages.

In some implementations, where the at least one message feature includes an n-gram in the text of the original messages, the original message features determination engine 122 may determine the n-gram based on a count of occurrences of the n-gram in the electronic communications that include the reply n-gram in the reply text. For example, an n-gram that occurs in original messages of 1,000 of those electronic communications may be more likely to be determined as a message feature than an n-gram that occurs in original messages of only 200 of those electronic communications. In some implementations, where the at least one message feature includes an n-gram in the text of the original messages, the original message features determination engine 122 may additionally and/or alternatively determine the n-gram based on an overall popularity measure associated with the n-gram. For example, "The kids have been sick all week" may be an overall less popular n-gram than "Good morning" (e.g., based on it occurring less frequently over a large corpus of documents such as all electronic communications of the corpus) and may be more likely to be determined as a message feature based on it being less popular.

In some implementations, where the at least one message feature includes an n-gram in the text of the original messages, the original message features determination engine 122 may determine an n-gram that includes portions of the text of multiple of the original messages and include an identifier of a category or other higher level indication of other portions of the original messages. For example, an n-gram of "We have reservations at [Restaurant]. Let me know if you can make it" may be determined based on occurrences of "We have reservations at White Castle. Let me know if you can make it" in a first original message, "We have reservations at Waffle House. Let me know if you can make it" in a second original message, etc.

Generally, in determining relationships between one or more original message features and reply content, strength of relationship engine 126 calculates a strength of relationship value between reply content determined by reply content determination engine 124 and the at least one message feature determined by original message features determination engine 122. In some implementations, strength of relationship engine 126 calculates the strength of relationship based at least in part on a quantity of the electronic communications of the corpus that include both the reply content and the at least one message feature. For example, a "stronger" strength of relationship value may be determined between a message feature and reply content when the message feature and the reply content occur in 1,000 communications of the corpus than if they occurred only in 300 communications of the corpus.

In various implementations, multiple message features may be determined by the original message features determination engine 122, and the strength of relationship engine 126 may determine a strength of relationship value for the multiple message features as a collective and/or for various divisions of the multiple message features. For example, a first message feature may be a first n-gram and a second message feature may be a second n-gram. The strength of relationship engine 126 may calculate a strength of relationship value between the first n-gram and the reply content, the second n-gram and the reply content, and/or between the first and second n-grams and the reply content.

The strength of relationship engine 126 further defines a relationship between the at least one message feature and the reply n-gram based on the strength of relationship value. In some implementations, defining the relationship between the at least one message feature and the reply content based on the strength of relationship value comprises defining the relationship and assigning the strength of relationship value to the relationship. In some implementations, defining the relationship between the at least one message feature and the reply content based on the strength of relationship additionally and/or alternatively comprises determining the strength of relationship value satisfies a threshold and defining the relationship based on determining the strength of relationship value satisfies the threshold.

In some implementations, at least the strength of relationship engine 126 may be implemented as a machine learning system. In those implementations, training examples may be generated by the reply content system 120 that each have an output parameter indicative of reply content determined by reply content determination engine 124 and one or more input parameters indicative of a corresponding original message feature(s) determined by the original message features determination engine 122 based on the original text of one of the electronic communications that include the reply content in the reply message. For example, a first training example may include, as an output parameter, the reply content and, as an input parameter, all or portions of the text of the original message (and optionally annotations associated with the text and/or other content of the original message) of a first communication that includes the reply content in the reply message. A second training example may include, as an output parameter, the reply content and, as an input parameter, all or portions of the original message (and optionally annotations associated with the text and/or other content of the original message) of a second communication that includes the reply content in the reply message. Additional training examples may be similarly generated, including additional training examples based on other reply content and associated original text.

The machine learning system may be trained based on the training examples. The training of the machine learning system may include the calculating the strength of relationship and the defining the relationship. For example, the strength of relationship between particular message feature(s) and particular reply content may be based on the quantity of training examples that include the particular message feature(s) and the particular reply content. The trained machine learning system may be utilized to identify one or more candidate reply texts for an additional communication (as explained herein) by providing, as input to the machine learning system, one or more message features of the additional communication and receiving, as output from the machine learning system, information indicative of one or more suggested replies (and optional associated strength of relationship value(s)).

In some implementations, each of the output parameters of the training examples may be an indicator of a respective one of the clusters optionally determined by original reply content determination engine 124. As described herein, the reply messages of each of the clusters may include multiple unique n-grams that are all semantically and/or otherwise similar to one another. Utilizing the indicators of the clusters instead of the unique n-grams themselves may reduce the number of output variables in the training examples, which may lead to more efficient training of the machine learning system. In some of those implementations, the machine learning system may be trained to provide, as output, one or more of the indicators of the clusters. The strength of relationship engine 126 and/or other component may then utilize a further mapping of the indicator of the clusters to n-grams (and optionally weights associated with the mapping) and select one or more of the n-grams as reply text to utilize in a reply. For example, as described herein, in determining clusters reply content determination engine 124 may indicate, as reply content for a particular cluster, an indicator of the cluster and/or one or more frequently occurring n-grams of the cluster. For instance, the cluster may contain electronic communications with "congratulatory" reply content such as the n-grams "Congrats!", "That's awesome", and "Way to go". In such an example, the machine learning system may provide, as output, and indicator of the cluster, and the cluster may be mapped to the aforementioned n-grams (optionally along with weights that may be based on, for example, frequency of occurrence of the n-grams in reply messages the cluster). The mapping may be utilized to select one or more n-grams to provide as reply text for inclusion in a reply.

The relationships defined by the strength of relationship engine 126 may be stored in relationships between message features and reply content database 158. For example, original message features and reply content may be stored as nodes and edges that connect the nodes may define the relationships. The edges may optionally be weighted to define the strength of those relationships. In implementations where machine learning is utilized, the machine learning system may also store data in relationships between message features and reply content database 158 that defines determined relationships between original message features it has determined to be useful (based on input parameters of the training examples) and the reply content (based on output parameters of the training examples).

Figure 2:
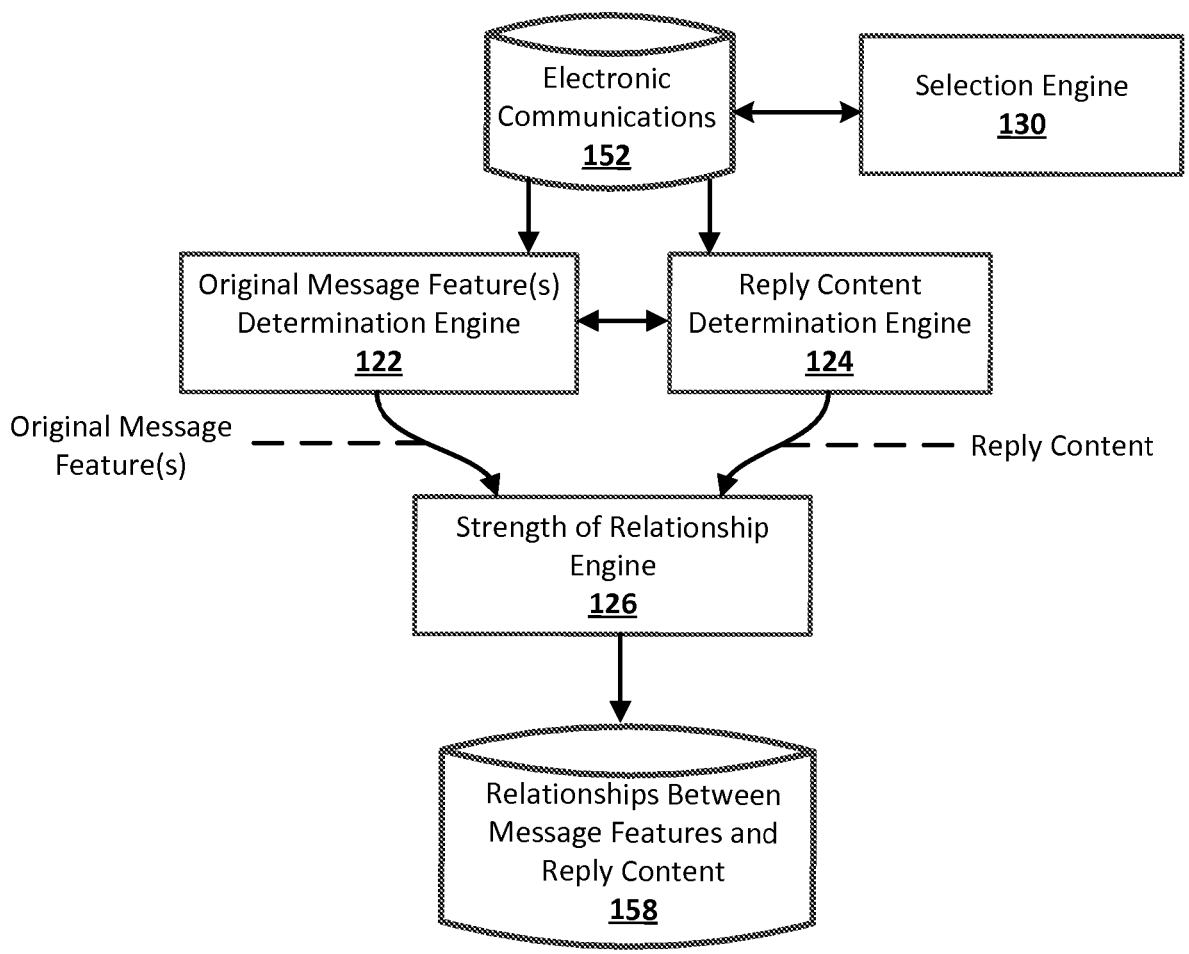
FIG. 2 illustrates an example of how relationships between one or more original message features and reply content may be determined based on a corpus of electronic communications.

FIG. 2 illustrates an example of how relationships between one or more original message features and reply content may be determined based on a corpus of electronic communications. Reply content determination engine 124 identifies a corpus of electronic communications from the electronic communications database 152 and determines reply content that occurs in the reply message of a plurality of the electronic communications of the corpus. The electronic communications of the corpus include a reply message and an original message to which the reply message is responsive. In some implementations, the selection engine 130 may select, based on one or more criteria, communications to include in the corpus that is identified and analyzed by the reply content determination engine 124. In some implementations, the reply content determination engine 124 determines a reply n-gram that occurs in the reply text of reply messages of at least a threshold number of the electronic communications of the corpus and utilizes the reply n-gram as reply content.

The original message features determination engine 122 determines one or more original message features based on the original message of one or more of the electronic communications that include the reply content. For example, the reply content determination engine 124 may provide to the original message features determination engine 122, an indication of the electronic communications that include the reply content, and the original message features determination engine 122 may analyze the original message of those electronic communications to determine the one or more original message features. For example, where the reply content is an n-gram, the original message features determination engine 122 may determine the original message features based on analyzing the original message of one or more of the electronic communications that include the n-gram in a reply message.

The determined reply content and the original message feature(s) are provided to the strength of relationship engine 126. The strength of relationship engine 126 calculates a strength of relationship value between reply content determined by reply content determination engine 124 and the at least one message feature determined by original message features determination engine 122. In some implementations, strength of relationship engine 126 calculates the strength of relationship based at least in part on a quantity of the electronic communications of the corpus that include both the reply content and the at least one message feature. For example, a "stronger" strength of relationship value may be determined between a message feature and reply content when the message feature and the reply content occur in 2,000 communications of the corpus than if they occurred only in 200 communications of the corpus. Although not illustrated in FIG. 2, in some implementations the strength of relationship engine 126 may be in communication with the electronic communications database 152 to, for example, determine a quantity of the electronic communications of the corpus that include both the reply content and the at least one message feature.

As described herein, in some implementations, at least the strength of relationship engine 126 may be implemented as a machine learning system. In those implementations, the reply content and the original message features of FIG. 2 may be provided as training examples that each have an output parameter indicative of the reply content determined by reply content determination engine 124 and one or more input parameters indicative of the corresponding original message feature(s) determined by the original message features determination engine 122 based on the original text of one of the electronic communications that include the reply content in the reply message. The machine learning system may be trained based on the training examples.

Figure 3:
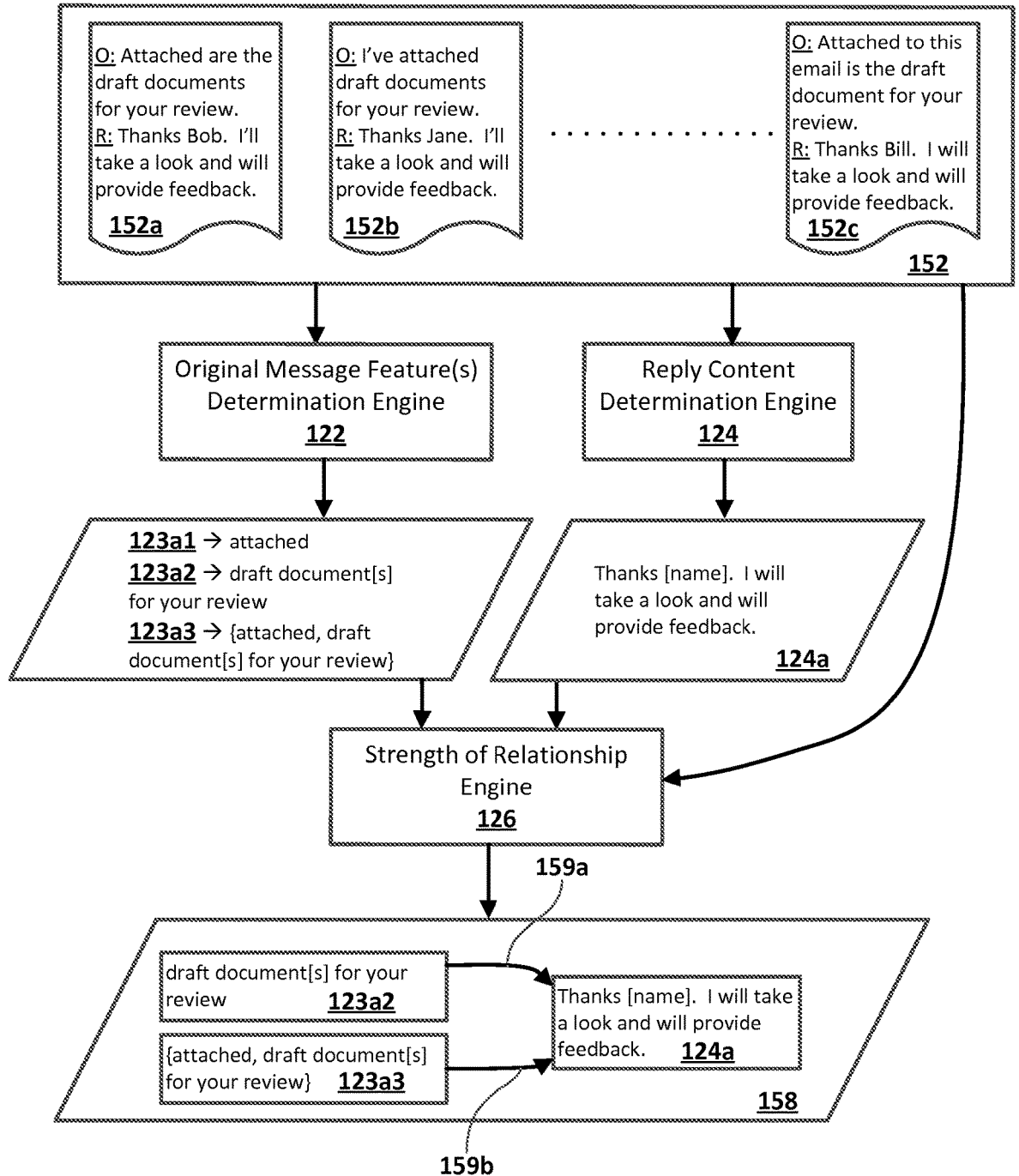
FIG. 3 illustrates another example of how relationships between one or more original message features and reply content may be determined based on a corpus of electronic communications.

FIG. 3 illustrates another example of how relationships between one or more original message features and reply content may be determined based on a corpus of electronic communications. Reply content determination engine 124 identifies a corpus of electronic communications from the electronic communications database 152 and determines reply content 124a that occurs in the reply message of a plurality of the electronic communications of the corpus. The reply content 124a is the n-gram "Thanks [sender's first name]. I will take a look and provide feedback" that occurs in the reply messages of communications 152a, 152b, 152c, and optionally additional communications. The reply messages in each of the communications 152a, 152b, and 152c include the text that follows "R:". It is noted the reply content 124a includes the higher level indication "[sender's first name]", which is a category that encompasses the individual names "Bob", "Jane", and "Bill" who were the senders of the original messages of respective of the electronic communications 152a, 152b, and 152c. The reply content determination engine 124 may determine the individual names correspond to the first name of the senders based on, for example, comparison of the individual names to metadata of the original messages of the electronic communications 152a, 152b, and 152c.

The original message features determination engine 122 determines original message features 123a1, 123a2, and 123a3 based on the original message of a plurality of the electronic communications that include the reply content. The first original message feature is indicated by 123a1 as the n-gram "attached" that occurs in the original messages of communications 152a, 152b, 152c, and optionally additional communications. The second original message feature is indicated by 123a2 as the n-gram "draft document[s] for your review" ("[s]" indicates "document" could be singular or plural) that occurs in the original messages of communications 152a, 152b, 152c, and optionally additional communications. The third original message feature is indicated by 123a3 as co-occurrence of the n-grams of the first and second original message features that occurs in the original messages of communications 152a, 152b, 152c, and optionally additional communications.

The determined reply content 124a and the original message features 123a1, 123a2, and 123a3 are provided to the strength of relationship engine 126. The strength of relationship engine 126 calculates a strength of relationship value between the reply content 124a and each of the original message features 123a1, 123a2, and 123a3. Based on the strength of relationship values, the strength of relationship engine 126 defines, in database 158, a relationship 159a between the second original message feature 123a2 and the reply content 124a. Based on the strength of relationship values, the strength of relationship engine 126 also defines, in database 158, a relationship 159a between the third original message feature 123a3 and the reply content 124a. In some implementations, the strength of relationship engine 126 may also assign the respective strength of relationship values to the relationships 159a and 159b.

Based on the strength of relationship values, the strength of relationship engine 126 does not define a relationship between the first original message feature ("attached") and the reply content. For example, the strength of relationship engine 126 may have calculated the strength of relationship values for each of the original message feature based on comparison of: a quantity of the electronic communications of the corpus that include both the reply content and the at least one message feature; to a quantity of the electronic communications of the corpus that include the at least one message feature in the original message and include a reply message that does not include the reply content. For instance, the strength of relationship engine 126 may have determined 1,000 communications included "draft document[s] for your review" in the original message and the reply content in the reply message; whereas 50,000 communications included "draft document[s] for your review" in the original message and included a reply message that does not include the reply content. The strength of relationship engine 126 may determine the strength of relationship value between the second original message feature 123a2 and reply content 124a based on comparison of those two values (e.g., 1,000/50,000=0.02)— and determine the strength of relationship value satisfies a threshold appropriate for defining a relationship between the second original message feature 123a2 and reply content 124a. On the other hand, the strength of relationship engine 126 may have determined 2,000 communications included "attached" in the original message and the reply content in the reply message; whereas 500,000 communications included "draft document[s] for your review" in the original message and included a reply message that does not include the reply content. The strength of relationship engine 126 may determine the strength of relationship value between the first original message feature 123a1 and reply content 124a based on comparison of those two values (e.g., 2,000/500,000=0.004)—and determine the strength of relationship value fails to satisfy a threshold appropriate for defining a relationship between the first original message feature 123a1 and reply content 124a.

Figure 4:
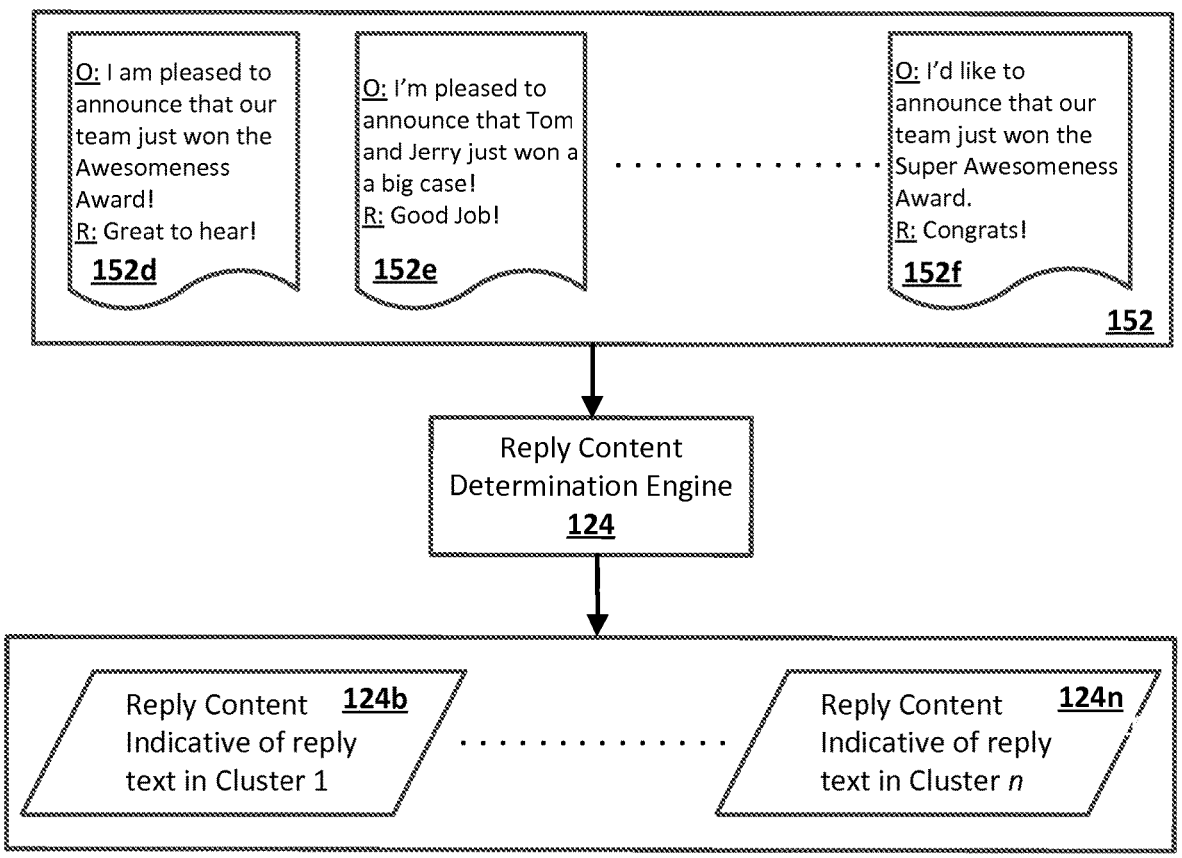
FIG. 4 illustrates an example of grouping electronic communications into a plurality of clusters based on similarities between those communications, and determining reply content based on the reply text of the electronic communications of the clusters.

FIG. 4 illustrates an example of grouping electronic communications into a plurality of clusters based on similarities between those communications, and determining reply content based on the reply text of the electronic communications of the clusters. Reply content determination engine 124 identifies a corpus of electronic communications from the electronic communications database 152 and groups the corpus of electronic communications into a plurality of clusters based on one or more attributes shared among one or more electronic communications within the corpus. For example, the reply content determination engine 124 may group the corpus of electronic communications into clusters based on similarities between the reply text of reply messages of the electronic communications of the corpus, such as semantic, syntactic, and/or textual similarities.

For example, the reply messages in each of the communications 152d, 152e, and 152f include the text that follows "R:" and each of the reply message include text that is generally "congratulatory" in nature. The reply content determination engine 124 may group those communications and additional communications into the same cluster based on the similarity between the reply text of the reply messages. Generally, the reply messages of electronic communications that are grouped in a given cluster correspond to a different category of reply content and will be more similar to one another (e.g., based on the similarities utilized in the grouping) than to the reply messages grouped in other clusters.

The reply content determination engine 124 determines reply content 124b through 124n that is indicative of reply text in each of the clusters. For example, reply content 124b is indicative of reply text in "Cluster 1". The reply content that is indicative of reply text in a cluster may include, for example, an identifier of a category (e.g., "congratulatory" reply content), an identifier of the n-grams that occur in reply content most frequently in the electronic communications of the cluster (e.g., the 50 most frequent n-grams), and/or other identifier of the content.

Referring again to FIG. 1, in providing reply text to include in a reply to a communication based on determined relationships between one or more message features of the communication and the reply text, strength of relationship engine 126 determines the candidate reply text based on one or more message features of the communication. For example, an electronic communication may be provided to the strength of relationship engine 126 by the client device 106, the electronic communications system 110 (optionally via the electronic communications database 152), and/or another component. The strength of relationship engine 126 identifies at least one message feature of the electronic communication and determines candidate reply text for inclusion in a reply to the message based on at least one defined relationship (and optionally the strength of the relationship, if any) between the at least one message feature and the candidate reply text.

In some implementations, such a determination may be made by strength of relationship engine 126 independent of any textual input provided via a computing device of the user in generating a reply to the electronic communication. In some of those implementations, the determination may be made before the user has even viewed or otherwise consumed the communication. For example, the strength of relationship engine 126 may process a communication in advance of viewing by the user, determine candidate reply text for inclusion in a reply to the communication, and append or otherwise associate the candidate reply text with the communication before it is viewed by the user.

In some implementations, the strength of relationship engine 126 determines a strength of relationship value between the at least one message feature and the candidate reply text and provides the candidate reply text for inclusion in the reply to the message based on the strength of relationship value. For example, in some implementations the candidate reply text may only be provided when the strength of relationship value satisfies a threshold. Also, for example, the prominence with which the candidate reply text is provided and/or how the candidate reply text is provided may be based on the strength of relationship value.

In some implementations, the strength of relationship engine 126 may identify multiple message features of the communication that each have a defined relationship to the candidate reply text. For example, a first relationship between a first message feature and the candidate reply text may be identified; and a second relationship between a second message feature and the candidate reply text may also be identified. In some of those implementations, a first strength of relationship value for the first relationship and a second strength of relationship value for the second relationship may also be identified and providing the candidate reply text for inclusion in the reply to the message may be based on the first strength of relationship value and the second strength of relationship value. For example, in some implementations the candidate reply text may only be provided when the sum, average, or other measure of those values satisfies a threshold. Also, for example, the prominence with which the candidate reply text is provided and/or how the candidate reply text is provided may be based on the strength of relationship values.

In some implementations, the strength of relationship engine 126 may identify a plurality of candidate reply texts to an electronic communication and optionally provide multiple of those for inclusion in the reply. For example, first and second reply texts may be identified based on respective relationships between the at least one message feature and the first and second texts. In some of those implementations, strength of relationship values for the first relationship (between the message feature(s) and the first reply text) and the second relationship (between the message feature(s) and the second reply text) may be identified and the first reply text may be provided for potential inclusion in the reply to the message based on comparison of the strength of relationship values. For example, the first reply text may be provided for potential inclusion in the reply to the message without providing the second reply text for potential inclusion in the reply to the message (e.g., when the strength of relationship value for the first reply text is much "stronger" than that for the second reply text). Also, for example, a display prominence for each of the first reply text and the second reply text may be determined based on the strength of relationship values and both the first reply text and the second reply text provided for potential inclusion in the reply to the message, along with an indication of the display prominences.

In some implementations where the electronic communication is provided to the strength of relationship engine 126 by the client device 106, the strength of relationship engine 126 may provide the determined reply text to the client device 106 for presentation to the user as an option for including in a reply. In some implementations where the electronic communication is provided to the strength of relationship engine 126 by the electronic communications system 110 via the electronic communications database 152, the strength of relationship engine 126 may store an association of the reply text with the electronic communication in the electronic communications database 152 and/or other database.

The strength of relationship engine 126 may also provide display prominence information with the determined reply text that indicates the prominence (e.g., position, size, color) with which the determined reply text should be presented. Generally, a stronger strength of relationship for particular reply text, the greater the prominence for that reply text. As one example, where multiple candidate reply texts are determined by the strength of relationship engine 126, the strength of relationship engine 126 may provide an indication of the prominence by ranking the multiple candidates based on respective strength of association scores and providing an indication of the ranking for use in determining in which order the multiple candidates should be presented.

In some implementations, the strength of relationship engine 126 provides only determined reply text, and potentially prominence information, and the client device 106 and/or electronic communications system 110 may generate a display of the determined reply text based on the provided data. In some implementations, the strength of relationship engine 126 may additionally provide some or all of the data necessary to generate the display. In some of those implementations, any provided prominence information may be incorporated in the data that indicates how the display should be presented.

As described herein, in some implementations, some reply content may be defined with one or more higher level indications of reply text. In those situations, the strength of relationship engine 126 may determine actual reply text for "filling in" the higher level indications of reply text. As one example, determined reply content may be an n-gram of "see you there [sender's first name]", with "[sender's first name]" being the higher level indication of reply text. The strength of relationship engine 126 may determine the first name of the sender of the electronic communication and include the first name in the n-gram in lieu of "[sender's first name]". The strength of relationship engine 126 may determine the first name of the sender based on, for example, metadata of the electronic communication and/or contact information of the user to whom the electronic communication was sent.

As another example, determined reply content may be an indication of a category of reply content such as "congratulatory reply" and the strength of relationship engine 126 may determine one or more highly ranked congratulatory n-grams as the reply text. The ranking of a particular n-gram may be based on, for example, its popularity for the user who received the electronic communication, for a group of users similar to the user, for all users, and/or its popularity as a reply n-gram in the corpus of electronic communications utilized to determine relationships between reply content and original message features. As one example, a plurality of n-grams may be mapped to "congratulatory reply" and one or more of the n-grams may be selected for a particular user based on a quantity of times the user has previously included those n-grams in past replies generated by the user.

As described herein, in some implementations the strength of relationship engine 126 may be a trained machine learning system. In those implementations, one or more candidate replies for a communication may be determined by providing one or more message features of the communication to the strength of relationship engine 126 as input. In response to the input, the strength of relationship engine 126 will provide one or more indications of reply text as output (and optional associated strength of relationship value(s)).

Figure 5:
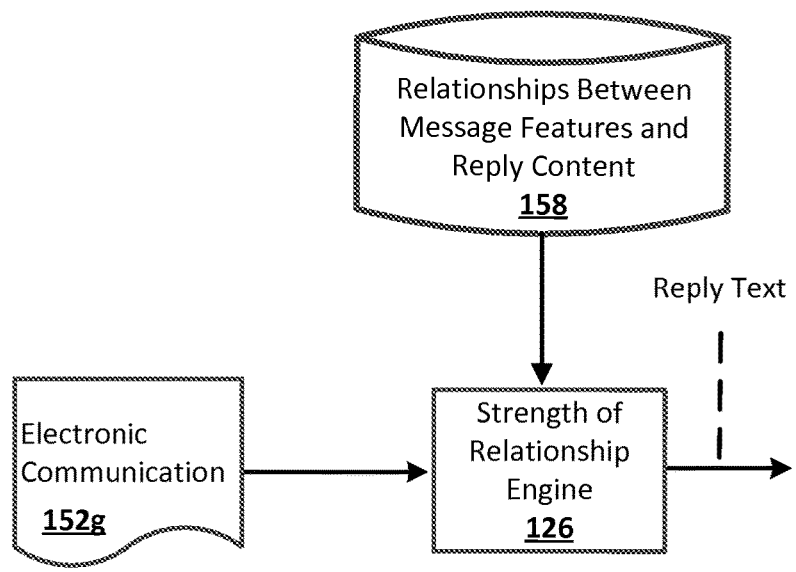
FIG. 5 illustrates an example of how reply text to include in a reply to a communication may be determined based on at least one defined relationship between one or more message features of the communication and the reply text.

FIG. 5 illustrates an example of how reply text to include in a reply to a communication may be determined based on at least one defined relationship between one or more message features of the communication and the reply text. Strength of relationship engine 126 receives an electronic communication 152*g*. The strength of relationship engine 126 identifies at least one message feature of the electronic communication 152*g* and determines candidate reply text for inclusion in a reply to the communication based on at least one relationship (and optionally the strength of the relationship) between the at least one message feature and reply content in the relationships between message features and reply content database 158. In some implementations, the reply content may be provided by the strength of relationship engine 126 as reply text for inclusion in a reply to the communication. In some implementations, some reply content may be defined with one or more higher level indications of reply text. In those situations, the strength of relationship engine 126 may determine actual reply text for "filling in" the higher level indications of reply text.

Figure 8A:
FIGS. 8A, 8B, and 8C illustrate example graphical user interfaces for presenting candidate reply texts for inclusion in a reply to an electronic communication.
Figure 8B:
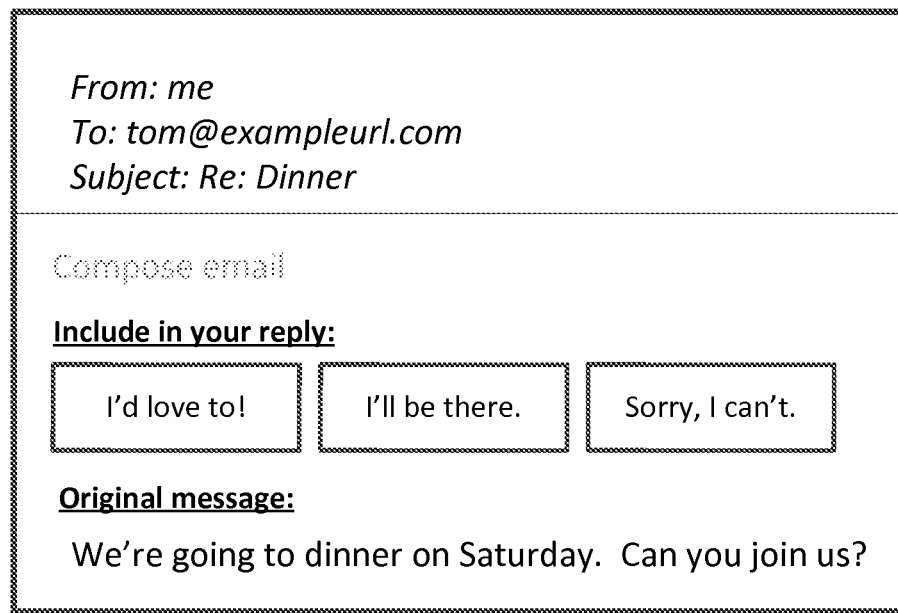
Figure 8C:
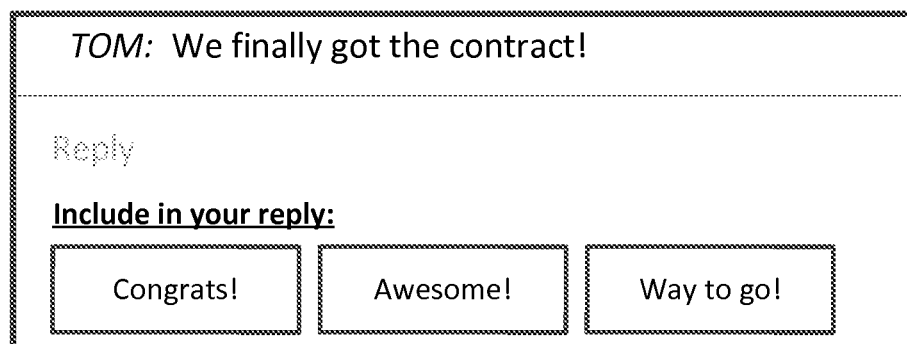

FIGS. 8A-8C illustrate example graphical user interfaces for presenting candidate reply text for inclusion in a reply to an electronic communication. The graphical user interfaces of FIGS. 8A-8C may be presented at client device 106 based on reply text that is determined and provided by strength of relationship engine 126. In some implementations, strength of relationship engine 126 may be incorporated, in whole or in part, on client device 106.

In FIG. 8A, an email that has been sent to a user is being viewed by the user. The candidate reply texts "I'd love to!", "I'll be there." and "Sorry, I can't" are determined based on the email and are presented for inclusion in the reply to the email. For example, a user selection of "I'd love to!" may automatically send a reply with "I'd love to!" and/or present an editable reply message to the user that may be prepopulated with "I'd love to." In FIG. 8A, the position in which the candidate reply texts appear may be based on a determined display prominence as described herein. For example, "I'll be there" may be most prominently displayed in the middle of the screen based on the display prominence.

In FIG. 8B, a user has provided input to reply to an email that has been sent to the user. The text "Compose email" indicates to the user where the user may select to begin composing the reply email. However, notably, in FIG. 8B the user has not yet provided any textual input in composing the reply email. The candidate reply texts "I'd love to!", "I'll be there." and "Sorry, I can't" are determined based on the email to which the user is replying (reproduced below "Original message:") and are presented for inclusion in the reply to the email. For example, a user selection of "I'd love to!" may automatically replace the "Compose email" text with "I'd love to!". In FIG. 8B, the position in which the candidate reply texts appear may be based on a determined display prominence as described herein.

In FIG. 8C, a user has provided input to reply to an SMS communication that has been sent to the user. The text "Reply" indicates to the user where the user may select to begin composing the reply. However, notably, in FIG. 8C the user has not yet provided any textual input in composing the reply. The candidate reply texts "Congrats!", "Awesome!" and "Way to go!" are determined based on the SMS communication to which the user is replying ("We finally got the contract!") and are presented for inclusion in the reply to the communication. For example, a user selection of "Congrats!" may automatically replace the "Reply" text with "Congrats". In FIG. 8C, the position in which the candidate reply texts appear may be based on a determined display prominence as described herein.

Figure 6:
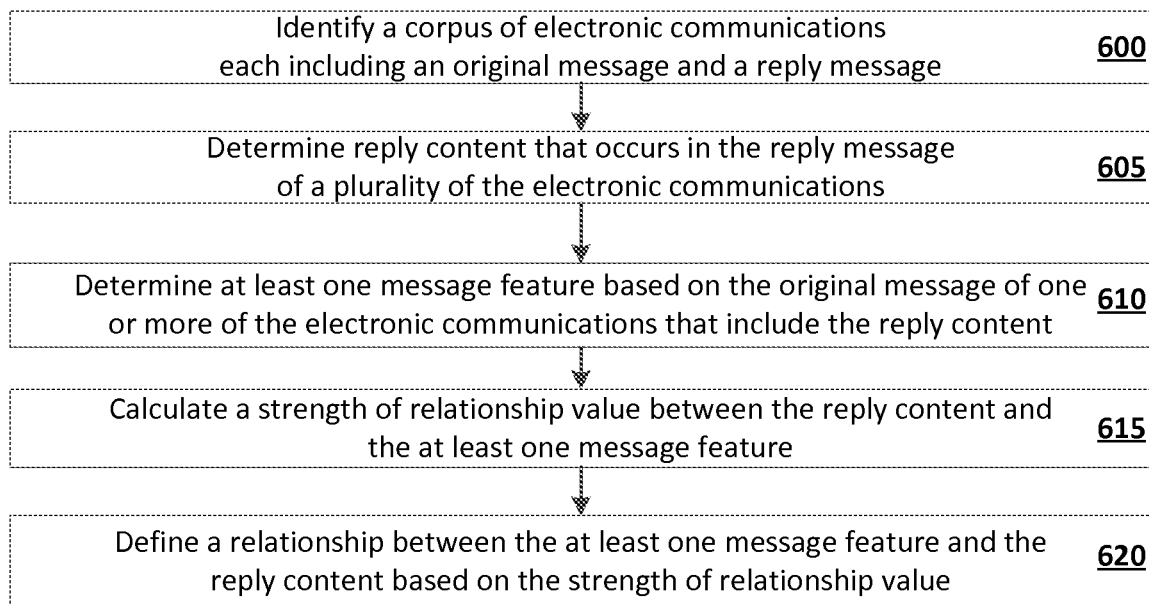
FIG. 6 is a flow chart illustrating an example method of determining a relationship between one or more original message features and reply content based on a corpus of electronic communications.

FIG. 6 is a flow chart illustrating an example method of determining a relationship between one or more original message features and reply content based on a corpus of electronic communications. For convenience, the operations of the flow chart are described with reference to a system that performs the operations. This system may include various components of various computer systems. For instance, some operations may be performed by one or more components of the reply content system 120, such as engines 122, 124, and/or 126. Moreover, while operations of the method of FIG. 6 are shown in a particular order, this is not meant to be limiting. One or more operations may be reordered, omitted or added.

At step 600, the system identifies a corpus of electronic communications. Each of the electronic communications of the corpus include an original message and a reply message. At step 605, the system determines reply content that occurs in the reply message of a plurality of the electronic communications of the corpus. At step 610, the system determines at least one message feature based on the original message of one or more of the electronic communications that include the reply content.

At step 615, the system calculates a strength of relationship value between the reply content the at least one message feature. In some implementations, the strength of relationship value may be calculated based at least in part on a quantity of the electronic communications that include both the reply content and the at least one message feature. At step 620, the system defines a relationship between the at least one message feature and the reply content based on the strength of relationship value.

Although the method of FIG. 6 is described with respect to a single instance of reply content, it is understood that one or more of the steps (e.g., all collectively) may be performed iteratively to determine multiple instances of reply content and respective original message features.

Figure 7:
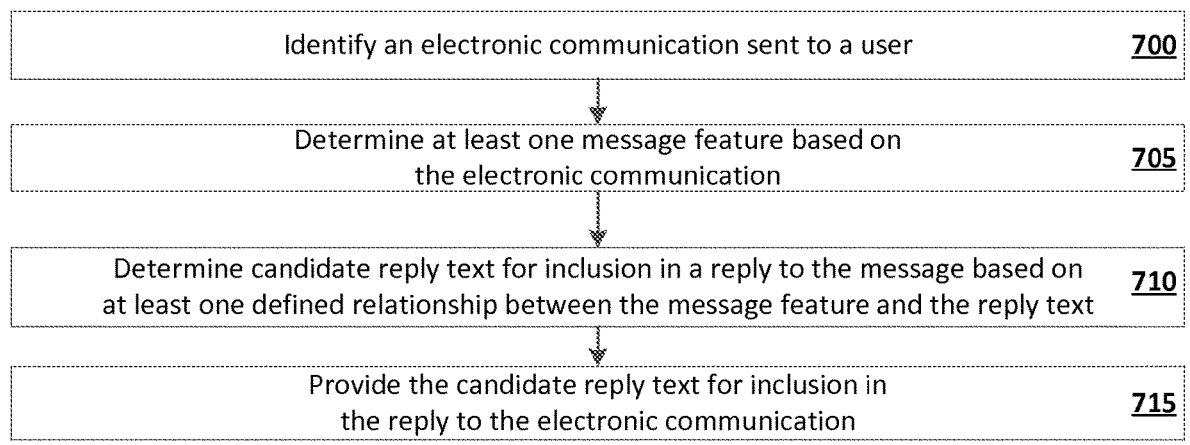
FIG. 7 is a flow chart illustrating an example method of determining reply text to include in a reply to a communication based on at least one defined relationship between one or more message features of the communication and the reply text.

FIG. 7 is a flow chart illustrating an example method of determining reply text to include in a reply to a communication based on at least one defined relationship between one or more message features of the communication and the reply text. For convenience, the operations of the flow chart are described with reference to a system that performs the operations. This system may include various components of various computer systems. For instance, some operations may be performed by one or more components of the reply content system 120, such as strength of relationship engine 126. Moreover, while operations of the method of FIG. 7 are shown in a particular order, this is not meant to be limiting. One or more operations may be reordered, omitted or added.

At step 700, the system identifies an electronic communication sent to a user. At step 705, the system determines at least one message feature based on the electronic communication.

At step 710, the system determines candidate reply text for inclusion in reply to the message based on at least one defined relationship between the message feature and the reply text. At step 715, the candidate reply text is provided for inclusion in the reply to the electronic communication.

In this specification, the term "database" will be used broadly to refer to any collection of data. The data of the database does not need to be structured in any particular way, or structured at all, and it can be stored on storage devices in one or more locations. Thus, for example, the databases 152 and/or 158 may each include multiple collections of data, each of which may be organized and accessed differently. Also, for example, all or portions of the databases 152 and/or 158 may be combined into one database and/or may contain pointers and/or other links between entries in the database(s).

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 9:
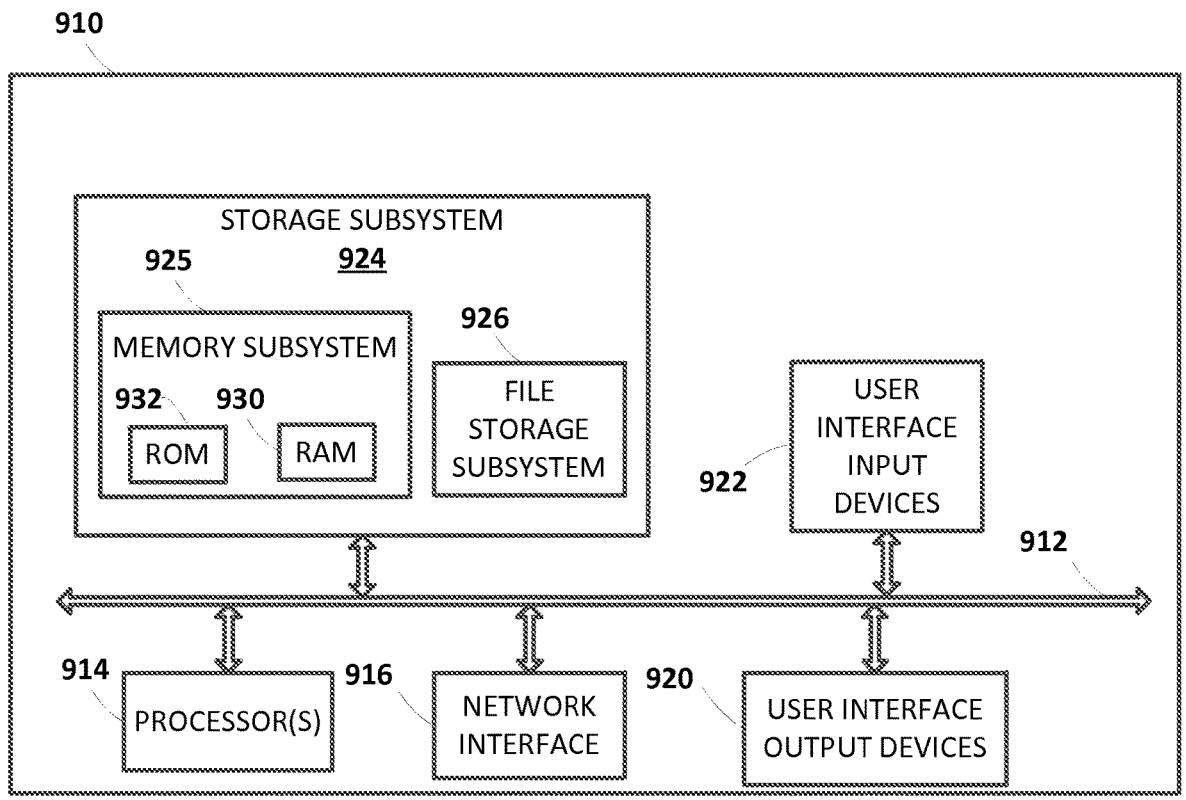
FIG. 9 illustrates an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of the methods of FIG. 6 and/or FIG. 7.

These software modules are generally executed by processor 917 alone or in combination with other processors. Memory 925 used in the storage subsystem can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 927, or in other machines accessible by the processor(s) 917.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by A system comprising:
memory storing instructions;
one or more processors operable to execute the instructions to:
identify an electronic communication that is formulated by a sending user and sent to a receiving user;
determine multiple message features of the electronic communication;
determine a given n-gram to provide as a suggestion for replying to the electronic communication, wherein in determining the given n-gram to provide as the suggestion one or more of the processors are to:
determine, based on processing the message features using a trained machine learning system, reply content that is appropriate for replying to the electronic communication, wherein the reply content indicates a plurality of unique n-grams that have similar semantic meanings;
select the given n-gram from the plurality of unique n-grams; and
before the receiving user has started typing, via a client device, any reply to the electronic communication:
cause the client device to present, along with a presentation of the electronic communication, the given n-gram as a selectable suggestion for inclusion in a reply to the electronic communication.

2. The system of claim 1, wherein in causing the client device to present, along with the presentation of the electronic communication, the given n-gram as the selectable suggestion, one or more of the processors are to:
provide, to the client device, the given n-gram;
wherein the client device generates a display of the given n-gram based on the given n-gram being provided.

3. The system of claim 1, wherein in causing the client device to present, along with the presentation of the electronic communication, the given n-gram as the selectable suggestion, one or more of the processors are to:
generate a display of the given n-gram.

4. The system of claim 1, wherein one or more of the processors are further operable to execute the instructions to:
in response to a selection of the given n-gram before the receiving user has started typing, via a client device, any reply to the electronic communication:
automatically send a reply to the electronic communication, wherein the reply includes the given n-gram.

5. The system of claim 1, wherein in selecting the given n-gram one or more of the processors are to select the given n-gram based on a quantity of times that the receiving user has previously included the given n-gram in past replies generated by the receiving user.

6. The system of claim 1, wherein selecting the given n-gram to provide as the suggestion for replying to the electronic communication occurs before the receiving user has viewed or otherwise consumed the electronic communication.

7. A system comprising:
memory storing instructions;
one or more processors operable to execute the instructions to:
identify an electronic communication that is formulated by a sending user and sent to a receiving user;
before the receiving user has viewed or otherwise consumed the electronic communication:
determine one or more message features of the electronic communication;
determine, based on processing the one or more message features using a trained machine learning system, multiple suggested textual replies that are appropriate for replying to the electronic communication, wherein the multiple suggested textual replies include at least a first textual reply and a second textual reply;
determine, based on the processing, to provide at least the first textual reply and the second textual reply as suggestions for replying to the electronic communication;
before the receiving user has started typing, via a client device, any reply to the electronic communication:
cause the client device to present the first textual reply and the second textual reply along with a presentation of the electronic communication, wherein the first textual reply and the second textual reply are each selectable.

8. The system of claim 7, wherein in causing the client device to present the first textual reply and the second textual reply along with the presentation of the electronic communication, one or more of the processors are to:
provide, to the client device, the first textual reply and the second textual reply;
wherein the client device generates a display of the first textual reply and the second textual reply based on the first textual reply and the second textual reply being provided.

9. The system of claim 7, wherein in causing the client device to present the first textual reply and the second textual reply along with the presentation of the electronic communication, one or more of the processors are to:
generate a display of the first textual reply and the second textual reply.

10. The system of claim 7, wherein one or more of the processors are further operable to execute the instructions to:
in response to a selection of the first textual reply or the second textual reply:
automatically send a reply to the electronic communication, wherein the reply includes the selected of the first textual reply or the second textual reply.

11. The system of claim 7, wherein one or more of the processors are further operable to execute the instructions to:
append the first textual reply and the second textual reply to the electronic communication before the receiving user has viewed or otherwise consumed the electronic communication;
wherein the client device presents the first textual reply and the second textual reply along with the presentation of the electronic communication based on the first textual reply and the second textual reply being appended to the electronic communication.

12. A system comprising:
memory storing instructions;
one or more processors operable to execute the instructions to:
identify an electronic communication that includes:
an original message formulated by a sending user, and
a reply message that is responsive to the original message and that is formulated by a replying user, wherein the reply message includes a textual segment that includes a particular name of the sending user and one or more additional terms;
generate a training example based on the electronic communication, wherein in generating the training example one or more of the processors are to:
generate one or more input parameters for the training example based on at least one feature of the original message;
generate at least one output parameter for the training example, wherein the at least one output parameter indicates the given textual segment with the particular name of the given sending user replaced by a higher level indication of a sender's name;
train a machine learning system based on the training example and based on a plurality of additional training examples generated based on additional electronic communications;
subsequent to training the machine learning system:
identify a new electronic communication sent by an additional sending user to an additional receiving user;
provide given message features of the new electronic communication as input to the trained machine learning system;
receive, as given output from the trained machine learning system in response to providing the given message features as input, a given indication that the given textual segment with the higher level indication of a sender's name is appropriate for inclusion in a given reply to the given electronic communication;
generate a suggested textual reply by replacing the higher level indication of the sender's name with a name of the additional sending user that sent the new electronic communication, wherein the suggested textual reply includes the name of the additional sending user and includes the one or more additional terms;
cause a client device of the additional receiving user to present the suggested textual reply, as a suggestion for inclusion in the given reply to the new electronic communication, before the additional receiving user has started typing, via the client device, any reply to the new electronic communication.

13. The system of claim 12, wherein the client device presents the suggested textual reply as selectable.

14. The system of claim 13, wherein the client device presents the suggested textual reply along with a presentation of the new electronic communication.

15. The system of claim 12, wherein one or more of the processors are further operable to execute the instructions to:
in response to a selection of the suggested textual reply:
automatically send the given reply to the new electronic communication, wherein the given reply includes the suggested textual reply.

16. The system of claim 12, wherein generating the suggested textual reply occurs before the additional receiving user has viewed or otherwise consumed the electronic communication.

17. The system of claim 12, wherein one or more of the processors are further operable to execute the instructions to determine the name of the additional sending user based on metadata of the new electronic communication.

18. The system of claim 12, wherein one or more of the processors are further operable to execute the instructions to determine the name of the additional sending user based on contact information of the additional receiving user.

* * * * *